(12) United States Patent
Schrader et al.

(10) Patent No.: US 8,616,154 B2
(45) Date of Patent: Dec. 31, 2013

(54) METHOD OF AND DEVICE FOR MILKING A DAIRY ANIMAL

(75) Inventors: Jan Willem Schrader, Spankeren (NL); Pieter Gerlof De Groot, Giessenburg (NL)

(73) Assignee: Lely Patent N.V., Maassluis (NL)

( * ) Notice: Subject to any disclaimer, the term of this patent is extended or adjusted under 35 U.S.C. 154(b) by 65 days.

(21) Appl. No.: 13/165,805

(22) Filed: Jun. 22, 2011

(65) Prior Publication Data

US 2011/0247564 A1    Oct. 13, 2011

Related U.S. Application Data

(63) Continuation of application No. PCT/NL2009/000249, filed on Dec. 11, 2009.

(30) Foreign Application Priority Data

Dec. 22, 2008 (NL) ................................. 1036347

(51) Int. Cl.
*A01J 5/007* (2006.01)
(52) U.S. Cl.
USPC ...................... 119/14.02; 119/14.08; 119/14.1
(58) Field of Classification Search
USPC ............ 119/14.02, 14.01, 14.08, 14.1, 14.14, 119/14.15, 14.16, 14.17
See application file for complete search history.

(56) References Cited

U.S. PATENT DOCUMENTS

| | | | | |
|---|---|---|---|---|
| 4,064,838 A | * | 12/1977 | Mukarovsky et al. | ..... 119/14.08 |
| 4,292,926 A | * | 10/1981 | Tilman | ......... 119/14.02 |
| 4,771,007 A | * | 9/1988 | Tippetts et al. | ............... 436/150 |
| 5,090,359 A | * | 2/1992 | Pettersson et al. | ......... 119/14.08 |
| 5,704,311 A | * | 1/1998 | van den Berg | ............. 119/14.02 |
| 5,873,323 A | * | 2/1999 | van den Berg et al. | .... 119/14.02 |
| 6,823,817 B2 | * | 11/2004 | van den Berg et al. | .... 119/14.02 |
| 6,830,008 B2 | | 12/2004 | Sjolund et al. | |
| 2007/0209595 A1 | * | 9/2007 | Umegard et al. | .......... 119/14.02 |
| 2009/0151642 A1 | * | 6/2009 | Wartenhorst | ............... 119/14.02 |
| 2009/0177418 A1 | * | 7/2009 | Innings et al. | ................... 702/51 |

FOREIGN PATENT DOCUMENTS

| | | |
|---|---|---|
| NL | 1018633 C2 | 1/2003 |
| WO | 03/000042 A | 1/2003 |

OTHER PUBLICATIONS

ISR and Written Opinion of PCT/NL2009/000249 issued Mar. 19, 2010 by the EPO.

\* cited by examiner

*Primary Examiner* — Rob Swiatek
*Assistant Examiner* — Ebony Evans
(74) *Attorney, Agent, or Firm* — Hoyng Monegier LLP; Coraline J. Haitjema; David P. Owen

(57) ABSTRACT

A device for and method of milking dairy animals, in particular cows includes teat cups that are connected by a robot arm to respective teats of the dairy animal. This makes it possible to start the milking of the teats of the dairy animal. A milk flow from the respective teat can be measured. The milking can be ended by a control unit in dependence on a comparison value which is calculated on the basis of a milking parameter representative of a milk flow from the respective teat and in dependence on a deactivation threshold. A second manner of calculating is used for calculating the comparison value of the last teat. The milking of the last teat can also depend on the moment of ending the milking of the one-but-last teat.

27 Claims, 2 Drawing Sheets

METHOD OF AND DEVICE FOR MILKING A DAIRY ANIMAL

CROSS REFERENCE TO RELATED APPLICATIONS

This application is a continuation of PCT application number PCT/NL2009/000249 filed on 11 Dec. 2009, which claims priority from Netherlands application number NL 1036347 filed on 22 Dec. 2008. Both applications are incorporated by references in their entireties.

BACKGROUND OF THE INVENTION

1. Field of the Invention

The invention relates to a method of milking a dairy animal, in particular a cow and more particularly to a milking a dairy animal and ending the milking of the teats in dependence on a comparison value.

2. Description of the Related Art

U.S. Pat. No. 6,830,008, which is hereby incorporated by reference in its enterity, discloses a method and device for ending or deactivating the milking of an animal, in the case of cows often designated as the milking of the last or fourth quarter, wherein this milking technique comprises the accelerated ending of the milking because of the fact that, during the last quarter, a comparison different from the previous quarters takes place. It has been found that the method takes too little into account the individual animal. From U.S. Pat. No. 6,830,008 it is only known to provide a previously established deactivation threshold. Additionally, from U.S. Pat. No. 6,830,008 it is only known to raise the deactivation threshold.

It has been found that the known method is not optimal for enhancing the efficiency of the milking.

BRIEF SUMMARY OF THE INVENTION

It is an object of the invention to provide an improved milking technique for milking the animal.

According to a first aspect of the invention, this object is achieved by providing a method of milking dairy animals, in particular cows, comprising connecting teat cups to respective teats of the dairy animal, milking the teats of the dairy animal, measuring a milking parameter representative of a milk flow from that teat, and ending the milking of the teats. According to a particular aspect, the ending depends on a comparison value which is calculated on the basis of the milking parameter representative of the milk flow from the respective teat. As a result thereof, the moment of ending the milking is connected with the milk yield. The comparison value is a parameter, for example a machine parameter, which is connected with the measured milk flow. It may, for example, be the average milk yield during the last 10 seconds. Dependency in the sense of this application comprises 'co-determining' a result.

According to the first aspect of the invention, the method is further improved in that the ending of the milking of the last teat depends on a second comparison value which is calculated in a second manner in dependence on the milking parameters representative of the milk flow from the last teat, which second manner differs from a first manner of calculating the comparison value for the at least one teat of which the milking has been ended earlier. In particular for the last teat a comparison value can be calculated in another manner, so that, for example, a comparison value is obtained which corresponds to a greater extent to the instantaneous value of the milk flow. As a result thereof, the ending can take place more efficiently.

Therefore, the calculations for the ending of the milking of the previous teats and the last teat are different and non-uniform.

The method according to the invention can comprise retrieving a manner of calculating from a memory. There may be stored in the memory a plurality of manners of calculating, using, if desired, other input variables. The method according to the invention comprises retrieving and using the second manner of calculating.

In particular, in the method according to the invention, the step of ending the milking of the last teat is applied to the last two teats. In one embodiment, the ending of the milking of the last two teats depends on a second comparison value which is calculated in a second manner in dependence on the milking parameter representative of the milk flow from the last teat, which second manner differs from a first manner of calculating the comparison value for the at least one teat of which the milking has been ended earlier. For, it may occur that the two last teats are both slowly-milking teats which thus unnecessarily occupy capacity of the milking device. Therefore, the milking will not be optimal if only the milking of the last teat is adjusted according to the invention. By also ending the milking of the one-but-last teat in the manner according to the invention by means of a second manner of calculating, the milking can be optimized further.

The first and second manner of calculating the comparison value preferably comprise averaging the milking parameters representative of the milk flow over an averaging period, wherein the averaging period for the second manner of calculating is shorter than the averaging period for the first manner of calculating. As a result thereof, the comparison value for the last teat is averaged over a shorter period, which results in a value which is closer to the instantaneous value of the milk flow. As a result of the shorter averaging period, the comparison value will fall more rapidly and, for example, drop below a threshold, in which case the milking is ended.

Calculating the comparison value preferably comprises using a filter, wherein the second manner of calculating comprises using a filter different from that in the first manner. The first filter can, to a higher degree than the second filter, be aimed at obtaining a value which is closer to the instantaneous value of the milk flow.

Using the filter preferably comprises selecting milking parameters, wherein the milking parameters are within a specific range of values, wherein the range for the second manner of calculating differs from the range for the first manner. The range can be a specific bandwidth, for example +x % and -y % above and below an average value. By filtering and using in the further calculation only parameters that are situated within a bandwidth, extreme variations in those parameters are dampened/omitted.

In one embodiment, the ending depends on a deactivation threshold. The deactivation threshold is configured to continue the milking in case of sufficient milk flow/milk yield. Dependency in the sense of this application comprises 'co-determining' a result.

In one embodiment, the deactivation threshold is calculated during the milking and depending on the measured milking parameter. Additionally, one embodiment comprises adjusting and in particular raising said calculated deactivation threshold for the teat which is the last one that is being milked. Adjusting the deactivation threshold of the teat which is the last one that is being milked is carried out in such a manner that the milking will thus be ended more rapidly in comparison with the situation in which no adjustment takes place and is also based on data which become available during the milking. According to the invention, by adjusting the deactivation threshold, the ending of the milking of the last teat will be carried out more rapidly. The deactivation threshold preferably corresponds with a value that is representative of, for example, a minimum milk flow level. When the threshold is reached, the milking will be stopped. By raising the threshold, the minimum level will be reached sooner with advancing of the milking and, as a consequence, decreasing of the milk flow.

Embodiments of the invention comprise in any case the circumstance in which the last deactivation threshold, i.e. for the last teat, is adjusted or raised without taking the initial non-adjusted or non-raised deactivation threshold of the last teat into account. Adjusting or raising according to the invention comprises the embodiment in which deactivation thresholds for previous teats are calculated in a first manner, while the deactivation threshold for the last teat that is still being milked is calculated in another manner. The calculation of the thresholds is as it were non-uniform. Raising the last deactivation threshold according to the invention comprises a relative raise in comparison with a calculation of deactivation thresholds for previous teats.

According to the invention, the threshold is calculated during the milking. As a result thereof, the threshold can be set at a value which depends on the milk flow secreted by the animal. This makes it possible to determine the threshold value more accurately and in dependence on circumstances prevailing at that moment. In one embodiment, the threshold is based on the milk flow parameter for that teat. In another embodiment, milk flow parameters of a few teats are used. This provides a considerable improvement relative to the existing, pre-set deactivation thresholds.

One embodiment of the method comprises the step of activating the teat cup to milk a teat of the dairy animal, the step of measuring a milking parameter during the milking of the teat to obtain a value of the milking parameter, and the step of deactivating the teat cup when a deactivation threshold has been reached. The method comprises sending control signals between a computer or other processing device by means of which the possible ending of the milking is controlled, and the respective teat cup(s). Additionally, measurement signals can be sent from the various sensors to the computer or processing device.

It should be noted that from NL 1018633, which is hereby incorporated by reference in its entirety, that a method and device are known for calculating the deactivation threshold during the milking.

The invention is not limited to automatic milking. Conventional milking can also make use of the invention, in which case teat cups can be manually connected to the respective teats of the dairy animals. The method and the system according to the invention can work with automatic disconnection of teat cups. The ending of the milking can take place automatically.

The entire milking process comprises a stimulation phase, main milking phase, post-milking phase and disconnection phase. The method according to the invention preferably relates to the main milking phase and, of desired, the post-milking phase.

In order to achieve an even higher degree of efficiency of milking, the deactivation threshold is preferably calculated for each teat.

In one preferred embodiment, raising the deactivation threshold for ending the milking of the last teat is time-dependent. The time-dependency can be such that the more time progresses, the more the deactivation threshold will in each case be adjusted further and, in particular, raised. The time-dependent adjustment can take place step by step. The steps can in each case be equal steps or steps in terms of percentage. In a particular embodiment, the steps carried out are in each case increased. In one embodiment, the adjustment takes place continuously or almost continuously. Also in the case of continuous adjustment, an even or in each case increasing adjustment can be carried out. In one embodiment, a combination of stepwise and continuous is used.

In a preferred embodiment, the deactivation threshold calculated for the teat which is the last one that is being milked depends on the length of time from the ending of the milking of the one-but-last teat, so that the deactivation threshold ($D(t)$) is in each case raised over time. In a further embodiment, for the time-dependency are also taken into account the intervals between the start of the milking of the one-but-last teat and the start of the milking of the last teat. Raising can depend on the moment when the milking of that teat is started. This prevents the milking of the last teat from being ended too rapidly.

In one embodiment, calculating the comparison value is also time-dependent. The dependency of a length of time can be comparable with one of the above-mentioned time-dependencies of the deactivation threshold.

In one embodiment, it is advantageous to carry out the calculation of the comparison value and/or the deactivation threshold by averaging the milking parameters representative of the milk flow over an averaging period or averaging derived parameters which have been derived from the milking parameters representative of the milk flow. By including a degree of averaging in the calculation, peaks or dips in the instantaneous milk flow, which are also included in the values representative of the milk flow, are dampened. This permits to ignore temporary changes. It is thus prevented that the milking is ended too early.

In one embodiment, the averaging period has a predetermined duration. The duration can be stored in a memory, in particular a memory that is connected to the computer or the control unit. The averaging period has preferably a value of a few seconds, in particular about 30 seconds.

In one embodiment, the averaging period for the comparison value differs from the averaging period for the deactivation threshold. A longer averaging period results in a dampening of the parameters. This may be favourable or desirable for certain embodiments of the comparison value and/or the deactivation threshold. The averaging period for the deactivation threshold is preferably longer, which results in an enhanced accuracy. For the comparison value, which is directly connected to the milk yield, in each case the most recent data and a period prior thereto are taken into account.

In one embodiment, the averaging period varies per teat. In one embodiment, the averaging period for the last teat is shorter, as a result of which peaks in a value will have a greater influence. This is particularly advantageous if the averaging period is a period that immediately precedes the instantaneous measurement.

In one embodiment, a specific part of the milking phase is taken as the period over which the averaging is carried out. It has been found to be particularly advantageous to take as averaging period for the deactivation threshold an averaging period around a maximum of a milk yield. With most of the dairy animals, after the milking has been started, the milk yield will increase and have a maximum. The averaging period can be a period around this maximum. The peak value and the corresponding amount have been found to be a suitable measure to set a deactivation threshold for ending the milking. The peak value can be established during the milking. It is subsequently possible to determine the deactivation threshold during the measuring.

In a favourable embodiment, the ending of the milking depends on the comparison value reaching the deactivation threshold. The deactivation threshold is preferably a value which can be compared directly with the comparison value. The result of the comparison determines whether the milking will be ended.

It is advantageous to calculate the deactivation threshold and/or the comparison value in dependence on an interval, i.e. interval between the starting of the milking of respective teats. It is, for example, favourable to adjust the deactivation threshold further in dependence on the intervals. The deactivation threshold of each of the teats can depend on the intervals.

In particular, the deactivation threshold of the first, second, third teat or all non-last teats can be lowered while taking the intervals into account. This makes it possible to work up to a situation in which the milking of the teats is started at different moments, but is ended fairly shortly after one another. This results in an enhanced efficiency.

In one embodiment of a method according to the invention, historical milking data regarding the dairy animal are provided. A last-teat period can be calculated on the basis of the historical milking data. When a comparison value based on the milking parameters for the teat has reached the deactivation threshold, the milking of the last teat is ended after the calculated last-teat period has elapsed.

The last-teat period is a length of time. In one embodiment, the last-teat period is the maximum duration of the milking with the last teat cup. After this duration has elapsed, in one embodiment independently of the milk flow or the representative value thereof, the milking is ended. This may be a protective system of the device, which ends the method, and in particular the milking of the last teat, at any rate after the set length of time has elapsed.

The historical milking data are, for example, stored in a memory and relate to milkings of the dairy animal. In this embodiment, the last-teat period can be calculated before the milking is started. In one embodiment, the historical data comprise information based on the milking which is being carried out at that moment. The last-teat period is then calculated during the running milking.

In one embodiment, the milking data and the dairy animal identification are stored in a memory. In one embodiment, the method comprises identifying the dairy animal. This makes it possible to retrieve the data relating to the identified dairy animal from the memory. The historical data can also comprise data relating to the teat.

The last-teat period can be an additional measure to another, primary ending mechanism for deactivating the last teat cup. The last-teat period may comprise a minimum or a maximum period or both of them as an indication of the duration of the milking of the last teat. In one embodiment, the last-teat period can indicate a minimum duration, wherein the milking is not ended until the minimum duration has elapsed. An expected milk yield for a teat and in particular for the last teat can be derived from the historical milking data, the last-teat period being based on that milk yield.

In one embodiment, the last-teat period can have a value in a certain bandwidth, for example +x % and −y % above and below an average value based on the historical data. From the historical data comprising earlier milkings it is known how much time the milking of a specific teat at a previous milking took (on average). The last-teat period can be a period between −20% and +20% of that historical period.

If an ending moment based on another deactivation mechanism falls outside the bandwidth, it is possible to issue a warning signal. If it is found that the method based on the milking parameters of the last teat would result in a very early ending of the milking of the last teat, a warning of the presence of an infection of the teat can be issued.

In this embodiment, the last-teat period is used as a period after which a certain next step of a method can be carried out. The last-teat period is started at a certain moment. If another deactivation mechanism wishes to deactivate the milking too rapidly, it is possible to prevent this premature ending on the basis of the last-teat period. In general, this is a moment when a comparison value based on the milking parameters for the teat has reached the deactivation threshold.

In one embodiment, the last-teat period runs after the one-but-last teat (e.g., second-to-last teat) has been deactivated. In one embodiment, the ending is only permitted after the last-teat period has elapsed. There is thus set a minimum duration for the milking of the last teat. The milking can also be ended immediately after that last-teat period has elapsed. It is thus safeguarded that the milking of the last teat has a certain maximum duration.

In another embodiment, the course of the last-teat period takes place after the last teat has been deactivated. As a result thereof, the accelerated ending of the milking can be prolonged and a minimum milking duration of the milking of the last teat is safeguarded.

In one embodiment, the last-teat period has a value which corresponds to a period of a few seconds to a few minutes.

The last-teat period is preferably calculated during the milking. As a result thereof, the last-teat period can be made dependent on instantaneous milking parameters. This results in an enhanced efficiency. In one embodiment, the calculation of the last-teat period comprises the data with respect to the starting of the milking of that teat. This makes it possible to take into account a delay which has occurred during the milking, for example owing to a teat that could temporarily not be milked because of the fact that the teat cup was incorrectly positioned.

In one embodiment, the last-teat period depends on the duration of the milking of the one-but-last teat. Continuing the milking of the one-but-last teat can result in the last-teat period being lowered.

In one embodiment, the last-teat period is calculated in dependence on an interval between the starting of the milking of respective teats. If the starting of the milking is delayed, for example as a result of the fact that a connection of a teat cup to a teat takes a longer period of time, this can be included in the size of the last-teat period.

According to another aspect of the invention, there is provided a device for automatic or semi-automatic milking of a dairy animal, such as cow. The device according to the invention comprises teat cups and a robot arm, wherein the robot arm is configured to connect the teat cups to the teats of the dairy animal for milking the dairy animal, also comprising a measuring unit for measuring a milking parameter representative of a milk flow in the respective teat cups, wherein the measuring unit is connected to and is configured to send a measured milking parameter to a control unit. The control unit is preferably configured to calculate a comparison value, in a first manner, on the basis of the representative milking parameters and the control unit is configured to end the milking with the teat cups in dependence on the comparison value. In this application, by 'in dependence on' is meant inter alia 'co-determining'.

According to this aspect of the invention, the device is further improved in that the control unit is furthermore configured to calculate the comparison value for the last teat that is still being milked in a second manner, which second manner of calculating differs from the first manner of calculating the comparison value for the at least one teat of which the milking has been ended earlier.

The second manner of calculating preferably comprises a manner of calculating by means of which the instantaneous milk flow is monitored more accurately, so that the ending of the milking is accelerated.

The control unit is preferably able to generate an ending signal and to send it to deactivating means of the teat cups in order to end the milking, wherein the ending signal is capable of being generated when the calculated comparison value reaches a deactivation threshold.

The control unit is preferably configured to calculate the comparison value by averaging the milking parameters representative of the milk flow over an averaging period. The averaging period for the second manner of calculating preferably differs from the averaging period for the first manner.

In one embodiment, the control unit comprises a memory, wherein a deactivation threshold is stored in the memory and the control unit is configured to end the milking of the last teat in dependence on the comparison value and the deactivation threshold.

The efficiency of the milking technique is further enhanced in that the control unit is configured to calculate the deactivation threshold during the milking in dependence on the representative milking parameters. Additionally, the control unit can further be configured to raise the deactivation threshold calculated for the last teat cup. According to the invention, the ending becomes dependent on this raised threshold. According to the invention, data of the performed milking are included in the parameter or in the parameters which is/are used for ending the milking. As a result thereof, the secreted milk flows are able to co-determine the level of the threshold. In case a dairy animal has been milked fairly recently, i.e. the milking to be performed has been permitted but takes place relatively early after a previous milking, it will be possible to adjust the ending of the milking accordingly, because the values for the milk flows will be relatively lower. This can be included in the calculation of the deactivation threshold. Additionally, for the last teat a change in the deactivation threshold takes place, which will accelerate the ending of the milking of the last teat. This adjustment is preferably omitted for the previous teats. The adjustment is preferably a raise.

The device, and in particular the milking, is controlled by means of a control unit. It is possible for the latter to communicate via wired or wireless connections with the elements of the device. This makes it possible to collect data required for the invention in the control unit and to carry out calculations therewith. On the basis of the calculations and/or comparisons, it is subsequently possible for the control unit to send a signal to a suitable component, such as the teat cup, in order to support the operation thereof. It is possible for the control unit to control the starting of the milking and the ending of the milking.

The control unit is able to generate an ending signal and to send it to deactivating means of the teat cups in order to end the milking, wherein the ending signal is capable of being generated when the comparison value reaches the deactivation threshold. As a result thereof, the device is controlled in such a manner that the method can be carried out automatically. It is possible for the deactivation means to form part of the control unit.

It is particularly advantageous to configure the control unit in such a manner that the deactivation threshold is raised in dependence on a length of time from the ending of the milking of the one-but-last teat. As a result thereof, the more time has elapsed since the ending of the milking of the one-but-last teat, the more the ending will be accelerated.

In a particular embodiment, the control unit is configured to carry out the calculation of the comparison value for the last teat that is still being milked in a second manner, which differs from the manner in which the comparison values for previous has been calculated.

It is also advantageous to configure the control unit to calculate the comparison value and/or the deactivation threshold in dependence on an average of milking parameters representative of the milk flow over an averaging period.

The control unit preferably has a memory. The averaging period is stored in the memory. The averaging period can have a specific duration. The averaging period can also relate to a specific period during the milking, in particular the period around the maximum of the milk flow.

In particular, if the comparison value is calculated on the basis of averaging, the averaging period for the second manner of calculating can differ from the averaging period for the first manner. For the last teat a short averaging period can be taken. As a result thereof, the comparison value will have a value that corresponds to a higher degree to the instantaneous milk flow, so that a comparison value is obtained which is closer to the instantaneous value. This results in a more accurate limit of ending the milking and an enhanced efficiency.

The control unit can be configured to calculate the comparison value and/or the deactivation threshold in dependence on the duration of the milking with the respective teat cup. The deactivation threshold for the first quarter can be lowered in dependence on the interval between the starting of the milking of the first and the last quarter.

In one embodiment, the control unit comprises a memory in which a last-teat period is stored and the control unit is further configured to end the milking of the last teat cup in dependence on the course of a last-teat period. The course of the last-teat period is preferably started after a comparison value based on the milking parameters for the teat has reached the deactivation threshold. This makes it possible to limit or, on the contrary, prolong a duration of the milking of the last teat, because the last-teat period is also based on historical data, which prevents that last teat from being milked for a too long or too short period of time.

The historical data of a dairy animal can be stored outside the device and be made available, for example via a network, to the device and processing means of the device in order to calculate and store that last-teat period.

The control unit is preferably configured to calculate, during the milking, the last-teat period in dependence on measured milking parameters. The control unit is preferably configured to calculate, during the milking, the last-teat period in dependence on the duration of the milking of the teats. In another embodiment, the last-teat period has a predetermined size and this value is stored in the memory.

The control unit is preferably configured to calculate a comparison value based on the milking parameters, wherein a deactivation threshold is stored in the memory and wherein the control unit is further configured to end the milking of the last teat cup a last-teat period after a comparison value based on the milking parameters for the one-but-last teat has reached the deactivation threshold.

In one embodiment, the course of the last-teat period is started after the one-but-last teat has been deactivated.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings. The invention will be described with reference to the first embodiment of a device 1 for milking a dairy animal, such as a cow, provided with teat cup 2, shown in FIG. 1. The features of the inventive method will be set out clearly in the description with respect to the device.

Moreover, the invention will be explained in further detail by way of example with reference to a limited number of specifically mentioned milking parameters. However, it will be obvious that also other milking parameters, as described in the claims, can be used.

For a person skilled in the art it is obvious that merely by experimental research the variation of the milking parameter can be measured during the milking. Said variation can then be used, possibly processed by a mathematical formula, for at least co-determining the deactivation threshold.

Figure 1:
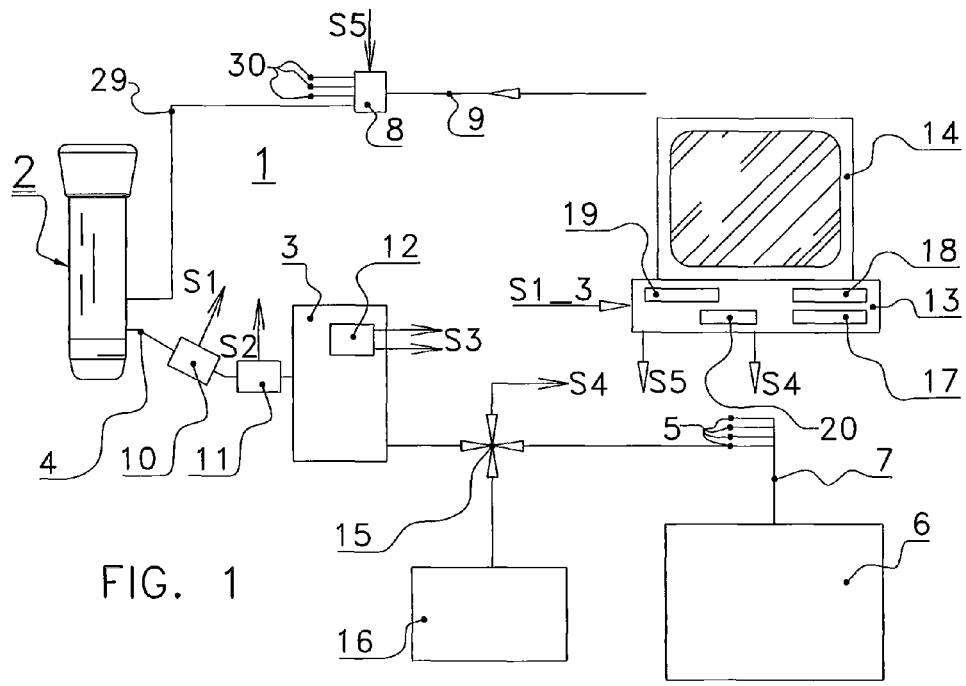
FIG. 1 is a schematic arrangement of a device according to the invention, provided with four teat cups.
Figure 2:
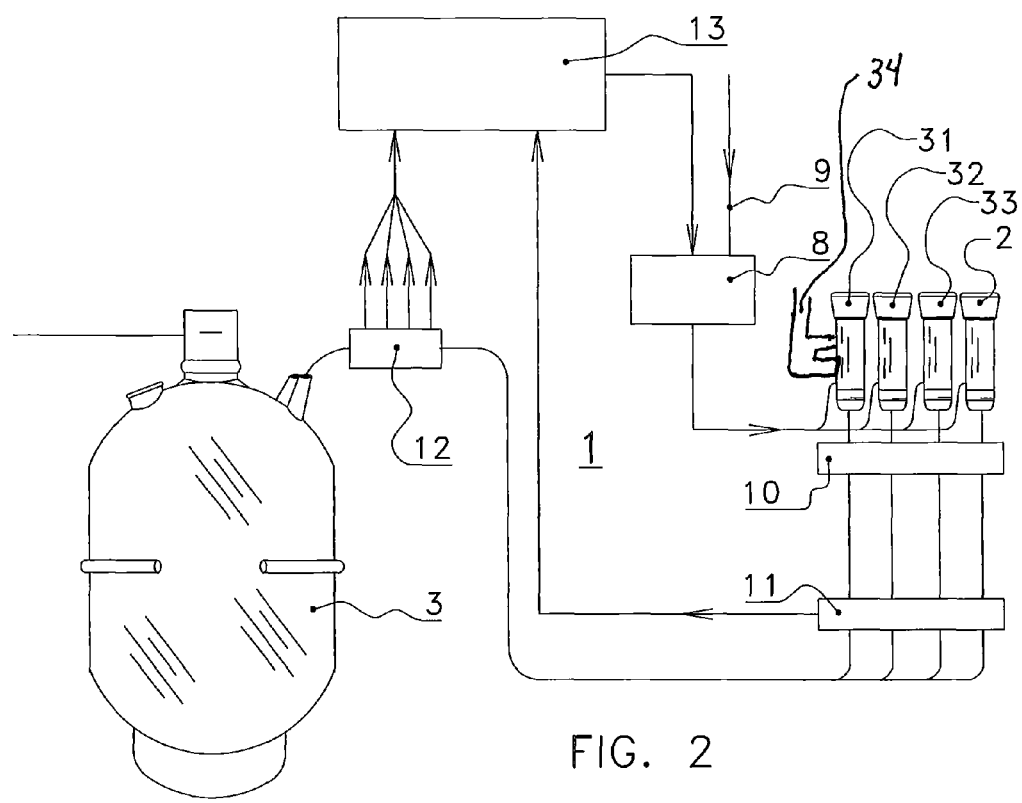
FIG. 2 is a schematic arrangement of a device according to the invention, provided with four teat cups.

FIG. 1 shows a teat cup 2 connected to a pulsator system 8 via a connection 29. The device 1 according to the invention, suitable for milking cows, comprises four teat cups 2,31,32, 33 which operate in a manner comparable with that of teat cup 2. The four teat cups 2,31,32,33 are shown in FIG. 2. FIG. 1 shows the connections 30 to the other teat cups 2,31,32,33.

The teat cup 2 shown in FIG. 1 can be automatically connected and disconnected to respectively from a teat of a cow by means of a milking robot which is not shown in the figures. In one embodiment, the teat cup 2 can be connected manually to the teat.

The milk yielded per udder quarter by means of the teat cup 2,31,32,33 can be supplied via separate milk lines 4 to a milk quantity meter or milk jar 3. The discharge line 5 of the milk jar 3 is coupled to a line 7 extending towards the milk tank 6. As known, the device 1 further comprises a pulsator system 8 for the teat cup 2. The vacuum line 9 for the pulsator system 8 is connected in a usual manner to a vacuum pump with balance tank.

By means of a robot arm 34 the teat cups 2,31,32,33 can be connected to the teats of the dairy animal.

In the milk line 4 there is included a milk flow meter 10 to establish the starting of the milk flow and to determine the value of the milk flow during the milking. Said milk flow meter 10 operates in this example on the basis of the creation by a milk flow of an electric connection between two electrodes.

Each teat cup 2.31.32.33 is provided with a milk flow meter 10 in a milk line 4. It is thus possible for each milk flow meter 10 to provide a milking parameter value which is representative of the respective milk flow which is obtained by means of the teat cup from the respective teat to which the teat cup 2,31,32,33 is connected.

The milking parameter representative of the milk flow can be sent from the measuring unit 10 to a suitable control unit 13. This is possible via a wired or wireless connection. The sent signal can be a combination of a signal for the milking parameter and a signal for identification of the respective milk flow meter or the respective teat cup 2,31,32,33. As a result thereof, it is possible for the receiver, the control unit 13, to link the received milking parameter to the teat from which the milk has been extracted.

In the milk line 4 there is also included a temperature meter 11 for establishing the milk temperature. The milk temperature is a good measure for the body temperature; with sick cows, such as cows affected by mastitis, the body temperature is higher than normally.

Near the milk jar 3, there is disposed a conductivity meter 12 for determining the electric conductivity, for example for establishing mastitis. Said conductivity meter 12 comprises a reservoir with electrodes for measuring the electric conductivity of the milk present in the reservoir. At each new milk flow the milk present in the reservoir is replaced. When the milk is affected, then an increased electric conductivity is established.

The outgoing signals S1, S2 and S3 of the respective meters 10, 11 and 12 are supplied to a computer 13 in which the information from these meters 10,11,12 will be further processed, as will be elucidated hereinafter, and possibly be made visible on a display screen 14.

Between the line 5 and the line 7 there is further included a three-way valve 15 in order to be able to discharge the milk flow from a quarter affected by mastitis of the udder of the cow to a waste tank 16. When, on the basis of the information communicated by the computer 13 the farmer decides to discharge milk to the waste tank 16 and gives for that purpose an appropriate command to the computer 13, the three-way valve 15 is switched over by means of a signal S4 supplied by the computer 13. The computer 13 can possibly transmit this signal S4 automatically to the three-way valve 15.

According to the invention, it is possible for the computer or control unit 13 to determine, on the basis of the data from the milk flow meter 10, the starting point of time on which the milk flow begins and to preferably store said starting point of time (temporarily or permanently) in a memory 17 linked to the computer 13.

It should be noted here that by the term storage is meant that the computer 13 keeps the data, at any rate at least as long as necessary for processing these. For storing the data the computer 13 comprises one or more memories 17 (in the embodiment shown only one memory is depicted for the sake of simplicity).

Figure 3A:
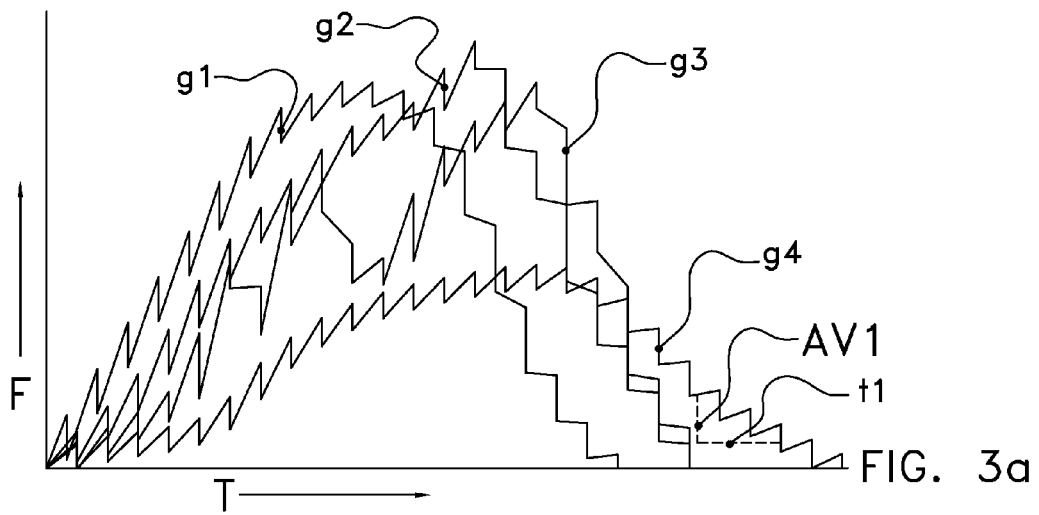
FIG. 3a is an example of measurement data of milk flows in a diagram in which the measured milk flow is indicated as a function of time.
Figure 3B:
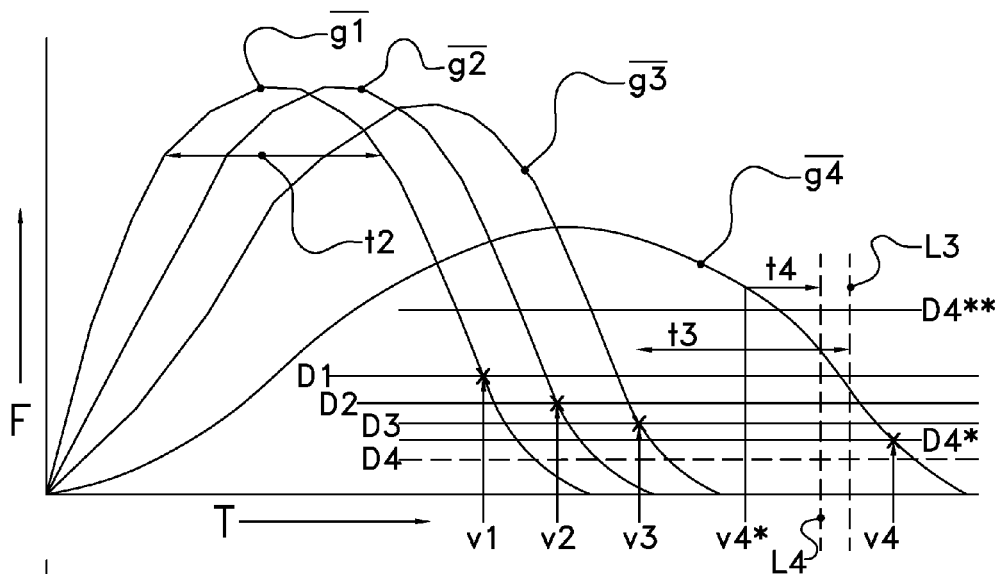
FIG. 3b is an example of average measurement data of the milk flows according to FIG. 3a in a diagram in which the average milk flow is indicated as a function of time.

It is possible for the control unit 13 to store a series of milking parameters. It is possible for the milk flow meter 10 to send in each case at fixed intervals a milking parameter to the computer 13, which milking parameter is stored in each case. As a result thereof, a series of milking parameters is stored in the memory 17 and a history for the milk flow from the respective teat can be recorded. It is possible for the series of milking parameters to be set out against time in a diagram. This is shown in FIGS. 3a and 3b. It is visible here that after some time the milk flow from a teat reaches a maximum and subsequently decreases.

The computer 13 may comprise a processing member 18 which is suitable for applying a mathematical function to the value of the average milk flow. Different algorithms may have been stored in a memory 17 of the computer 13 and be available for the processing of the milking parameters or other inputted data. It is possible for the algorithms to make use of other inputted data, for example data which are supplied to the computer 13 via a user's exchange 20, such as a keyboard connected to the computer 13. The computer 13 can be linked to a display screen on which an image is generated which facilitates the user's exchange.

In order to achieve an enhanced efficiency of the use of the milking device 1 the milking should be ended at a favourable moment. The favourable moment is determined to find an equilibrium between continuing the milking of the dairy animal already present in the milking device 1 or releasing said dairy animal and replacing it by a subsequent dairy animal. A dairy animal present in the milking device 1 can be released after the milking of all teats has been ended. An important moment which influences the efficiency is the moment when the milking of the last teat is ended.

For the determination of the ending of the milking, on the one hand, there is used a comparison value which is based on the milk flow from a teat and, on the other hand, there is used a deactivation threshold. When the comparison value reaches the deactivation threshold, the milking can be ended. The invention is based on improving the ending and thus relates to the calculation of the deactivation threshold and the calculation of the comparison value.

The control unit 13 is configured to use the milk flow parameter obtained via the milk flow meter for the calculation of a comparison value. The comparison value is used in the comparison with the deactivation threshold.

In one embodiment, the instantaneous milking parameter is used as comparison value. However, this has the disadvantage that, as a result of a sudden variation in the milk flow and the milking parameter related therewith, the milking can be deactivated.

In one embodiment, the comparison value depends on an average of the milking parameter over a certain period, the averaging period. In one embodiment, an average is determined over all milking parameters from the start of the milking. In one embodiment, averaging takes place after a predetermined delay.

FIG. 3 shows measurement data of four quarters of a dairy animal as a function of time in a diagram. FIG. 3*a* shows measured milk flow values g1-g4 which are representative of the milk flow from the respective teat cups 2,31,32,33.

For g4 there is shown an average of AV1 over an averaging period of t1.

If such an averaging is carried out for the whole curve g4 and also for the other curves g1-3, the diagram according to FIG. 3*b* is obtained. FIG. 3*b* shows, on the milk flow values g1-g4, parameters ĝ1-ĝ4 obtained by averaging. In one embodiment of the invention, these parameters are the comparison values ĝ1-ĝ4 with which the deactivation threshold (D1-D4) can be compared and by means of which the ending can be determined.

It is possible to calculate, at any arbitrary moment t during the milking, the value in the diagram according to FIG. 3*b* for the moment t−0.5×t1. The averaging ensures that the time value lags behind the actual time.

In one embodiment, averaging takes place over a predetermined averaging period. Said period may be stored in a memory 17.

In one embodiment, the predetermined averaging period is time-dependent. The averaging period can decrease according to the length of the milking duration. An algorithm which determines the dependency can be stored in memory 17.

In one embodiment, the averaging period depends on the number of teats still being milked or the milking of which has not yet been ended. The averaging period may be shorter for the last teat than for the one-but-last teat.

In one embodiment, the determination (the algorithm used for the calculation) of the comparison value differs from teat to teat (from quarter to quarter). This makes it possible to select for the first teat an algorithm which is less time efficient, whereas for the last teat an algorithm is selected which is particularly 'sharp' as a result of which the milking will be ended more rapidly.

It is possible for the algorithm to work with different inputs. In one embodiment, the temperature of the milk is included in the algorithm and the result is co-dependent on the measured temperature. In one embodiment, there is only taken another algorithm.

During the milking the deactivation threshold is determined. This deactivation threshold is preferably co-dependent on the measured milk flow. Preferably, one or a number of algorithms is stored in a memory 17. It is possible for the control unit 13, for example dependent on time, in particular on the length of time of measuring and, in a particular embodiment, dependent on the ending of a previous quarter, to select a suitable algorithm for the calculation of the deactivation threshold (D1,D2,D3,D4*).

The calculated deactivation threshold can be raised for the last quarter.

As a result of the mathematical function, a deactivation threshold, such as a threshold milk flow average, can be obtained. In dependence on the wishes a suitable function can be chosen.

In the embodiment shown, the milking of the teats starts in each case at approximately the same point of time, namely t=0. In another embodiment, the milking is started in each case with intervals because the teat cups 2,31,32,33 are connected to the teats at different moments. It is possible to include the respective intervals in the calculations of the deactivation thresholds.

In one embodiment, adjusting/raising the deactivation threshold of the last teat D4 is only carried out after the respective interval has elapsed with which the milking of the last teat was started after the one-but-last teat had been started. The acceleration of the ending is thus postponed by a period which is substantially equal to the later starting time of the milking of the last teat.

In one embodiment, the deactivation threshold (D1,D2,D3, D4*) is based on the milking parameter values within a specified time interval, for example the length of time t2 around the maximum of the milk flow, such as shown in FIG. 3*b*.

FIG. 3*b* shows four respective thresholds D1-D4 for the four milk flows g1-g4. The diagram shows the calculation of the threshold values during the milking in that the threshold values only appear after a certain period of time has elapsed.

In one embodiment, the milking of a teat is ended in dependence on the deactivation threshold. The deactivation of the milking is an important element of the efficient use of a milking device 1 according to the invention.

In one embodiment, the deactivation threshold is determined during the milking. This makes it possible to adjust a threshold to the specific properties of the dairy animal. The milk flow of the animal and in particular the milk flow of the respective teat can be taken into account.

However, from long research it has been found that for a rapid deactivation of the teat cup the function of 'dividing average milk flow by 3' is highly appropriate irrespective of the individual cow. It further appears that for a non-rapid deactivation the function of 'dividing average milk flow by 5' is highly appropriate irrespective of the individual cow.

In one embodiment, the calculation of the deactivation threshold depends on the measured milk flow. On the basis of the data supplied to the control unit it is possible, during the milking of the teat, to calculate a deactivation threshold for that teat cup.

In one embodiment, the deactivation threshold is calculated and the calculated deactivation threshold is adjusted and in particular raised in order to accelerate reaching the moment of deactivation of the milking. The adjustment may be an adjustment of the threshold by a fixed, predetermined percentage. In one embodiment, the adjustment of the calculated threshold depends on a milk flow parameter of the respective teat or of another teat.

In one embodiment, the size of the adjustment of the deactivation threshold depends on a length of time, in particular the duration of the milking.

In a particular embodiment, the size of the adjustment can be time-dependent, i.e. a function of time. In particular, the adjustment can in each case increase according to the length of the period of time elapsed. As a result thereof, the deactivation threshold will in each case be adjusted more rapidly and the moment of deactivation will be reached more rapidly.

In embodiments of the invention, two or more algorithms for ending the milking are carried out simultaneously by control unit 13. This means that the control unit 13 will apply, for example, both a time-saving algorithm according to the invention and a known or 'normal' algorithm. As a result thereof, the milking is ended in each case at the most efficient moment.

In one embodiment, in particular in the case of dairy animals the milking of which takes place substantially in accordance with the averages applied for that dairy animal, it is possible that two or more algorithms for the possible ending of the milking are followed simultaneously and that the 'normal' algorithm is the first to give a signal of ending the milking.

In one embodiment of the invention, the algorithms for enhancing the efficiency of the milking are intended for enhancing the efficiency of the milking of dairy animals which differ to a considerable extent from the averages applying for those dairy animals.

In a particularly favourable embodiment, the method comprises raising the calculated deactivation threshold, and reaching the deactivation threshold by means of the comparison value does not result in immediate ending of the milking, but a waiting time of a last-teat period is applied.

In one embodiment, the milking is ended when the comparison value reaches the raised, calculated deactivation threshold during a last-teat period. This means that the milking is only ended when the comparison value, for a certain minimum period of time, has a value which should result in deactivation. According to the invention, reaching the deactivation threshold is, on the one hand, accelerated in that the deactivation threshold is adjusted and in particular raised, but, on the other hand, there is provided a protection that the deactivation does not take place too rapidly, in that the milking is continued for at least a certain period of time, here in general designated as last-teat period, and when the comparison value changes during said period of time and leaves the deactivation area, i.e. assumes a value at which the milking is not deactivated, the method resulting in ending the milking will (temporarily) be stopped. When the comparison value reaches again the deactivation area, the last-teat period will be started again.

When, during the last-teat period, the comparison value has continuously a value situated in the deactivation area (in this application often designated as situated below the deactivation threshold), the milking will be ended.

According to the invention, the ending of the milking is accelerated by having the ending take place at a threshold which has been adjusted (raised) in order to end the milking more rapidly, but the ending will only take place when the milk flow is situated for a minimum period of time below said raised threshold.

In one embodiment, the threshold is raised by 20% and, consequently, for the last quarter the comparison value is compared with 120% of the deactivation threshold. In one embodiment, the last-teat period is set at 30 seconds. When the comparison value is, for 30 seconds, lower than 120% of the normally calculated deactivation threshold, the milking will be stopped.

In one embodiment, there is provided a method in which adjusting the calculated deactivation threshold is connected with the last-teat period. In a favourable embodiment, a larger raise of the deactivation threshold will be connected with a prolongation of the last-teat period. This results in a method in which the threshold of ending is reached more rapidly, but in which this threshold level has to be maintained for a longer period of time.

In one embodiment, a counter or clock is used in the device to follow the last-teat period.

In one embodiment, the teat cups 31,32,33,2 are connected to the teats at intervals. In one embodiment, the calculation of the last-teat period depends on the interval or intervals.

In one embodiment, the teat cups 31,32,33,2 are first connected to the rear teats and subsequently to the front teats. Extensive analysis of measurement data has demonstrated that the rear quarters are able to secrete more milk and for a longer period of time.

Figure 4:
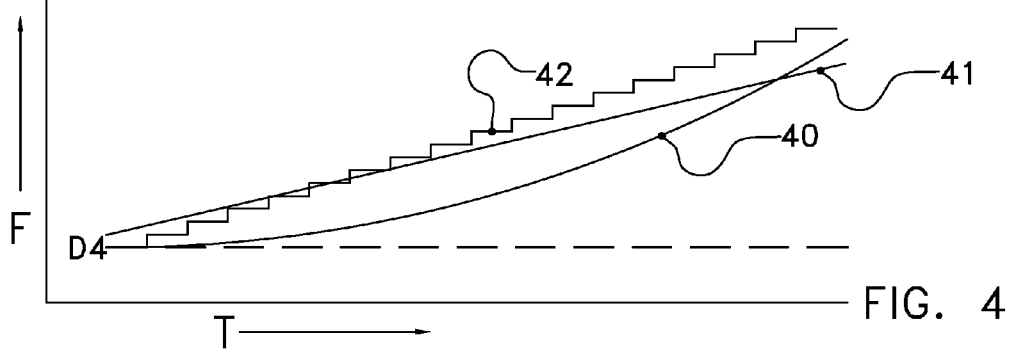
FIG. 4 is an example of the adjusted deactivation threshold.

FIG. 4 shows three exemplary embodiments. D4 shows the deactivation threshold in dotted lines as calculated if the same algorithm is applied as for the earlier mentioned thresholds D1-D3, as shown in FIG. 3b. The deactivation threshold 40 shows a threshold which grows exponentially over time. Threshold 41 is a threshold which has been raised by 30% with respect to threshold D4. Threshold 42 increases step by step.

Also the current milk flow as measured by the milk flow meter 10 can be stored by the computer 13. From these data the computer 13 continuously determines the average milk flow. Determination of the average milk flow can begin at the moment when the milk flow starts or, in order not to take into account the first measurements which may usually contain noise or differing values, when a predetermined period of time after the start of the milk flow, e.g. a period of time from 10 to 50 seconds, has elapsed.

The computer 13 further comprises a comparator 19 for comparing the current milk flow with the calculated deactivation threshold or, preferably, the threshold milk flow average. When the comparison indicates that the current milk flow is equal to or lower than the calculated deactivation threshold/threshold milk flow average, the computer 13 supplies a signal S5 controlling the deactivation of the teat cup 31,32,33,2. For example due to the fact that the signal S5 controls the pulsation system 8 in such a manner that the vacuum is removed from the teat cup 31,32,33,2. As a result thereof, the milking of the respective teat will be ended. In a next step, the teat cup 31,32,33,2 can be removed from the teat.

In FIG. 3b, the moments of reaching the respective threshold levels are denoted by crosses. At those moments v1-v4, the milking with the respective teat cup 31,32,33,2 is stopped.

From long research it has also been found that it is possible to divide the average milk flow produced by cows into certain milk flow ranges, and to allocate a certain threshold milk flow to each of these milk flow ranges. Such milk flow ranges and corresponding threshold milk flows are stored in the memory 17 of the computer 13. An example of such ranges is represented hereinafter in table I.

TABLE I

| Average milk flow range (ml/min) | Threshold milk flow (ml/min) |
|---|---|
| >500 | 400 |
| 370-500 | 120 |
| 250-370 | 50 |
| 170-250 | 30 |
| <170 | 20 |

The comparator 19 of the computer 13 compares the measured average milk flow with the ranges stored in the memory, and the computer 13 determines the corresponding deactivation threshold. When the current milk flow is equal to or lower than the deactivation threshold, the computer supplies the signal S5 for the deactivation of the teat cup 31,32,33,2.

It is noticed that as a deactivation threshold also other predetermined threshold values can be taken, e.g. those based on historical data.

In one embodiment, the milking of the last teat is ended after a last-teat period t3 has elapsed. The time t3 can be stored in a memory or be calculated according to an algorithm.

FIG. 3b shows an example of a calculated last-teat period t3. From the moment v3, i.e. the moment at which the milking of the third and one-but-last teat is ended, the last-teat period t3 starts to run. After the last-teat period, designated by the line L3, has elapsed, in this embodiment, the milking with the last teat cup 31,32,33,2 can be ended. In the embodiment shown, the ending because of the last-teat period having elapsed would take place earlier than the ending because of the adjusted deactivation threshold D4* being reached. The point of time associated with L3 is earlier than moment v4. The earlier ending results in an enhanced efficiency of the use of the milking robot.

In still another embodiment, D4* is raised to a considerably greater extent than in the embodiment of FIG. 3b. As a result thereof, the comparison value g4 will reach very rapidly the additionally raised deactivation threshold D4**. This can be point of time v4*. In another embodiment, despite the deactivation threshold D4 being reached, the milking is not ended, but continued. In one embodiment, after D4 has been reached, milking takes place at least for a length of time t4, as indicated in FIG. 3b, as a result of which the milking is ended at point of time L4*. An advantage of this embodiment is that the milking takes place at any rate when the milk production still has a relatively high value, that the milking is ended relatively rapidly, and that the milking is continued at least for a period t4 after the milk flow value has fallen to some extent. This algorithm results in an enhanced efficiency. The length of time t4 can be designated as a last-teat period. Said last-teat period can be predetermined and can as such be stored in a memory connected to control unit 13. In another embodiment, the last-teat period t4 is determined during the milking and the last-teat period t4 is co-determined on the basis of the milk flow data g1-g4.

The last-teat period can be determined beforehand or during the milking on the basis of historical milking data. The historical milking data may comprise the milking data such as those which are formed during the milking of the dairy animal. In one embodiment, the historical milking data comprise data of that milking based on the milking parameters (g1,g2,g3,g4). It may occur that connecting the teat cup 31,32,33,2 is not carried out completely correctly. A teat may, for example, be blocked temporarily. As a result thereof, that teat, anyhow during a starting period of the milking, produces a reduced amount of milk. By (temporarily) storing the milking parameters or data based on the milking parameter, there are collected historical milking data for the dairy animal. These milking data can be used for calculating a last-teat period, which makes it possible to take imperfections in connecting the teat cup 31,32,33,2 into account. By basing the last-teat period also on the reduced milk production at the start of the milking, it is possible to take that incorrect connection into account.

The historical milking data are based on the milking parameters (g1,g2,g3,g4). The historical milking data can be stored in a memory 17.

In one embodiment, the historical milking data are formed by data regarding earlier milkings of the dairy animal. In one embodiment, the dairy animal can be identified in the method of milking. The dairy animal may be provided with a measurable identification, such as a tag. Milking parameters or milking data based on the milking parameters can be stored together with an identification of the dairy animal. The historical milking data can be retrieved at a later point of time from the memory, either by a user or by the milking robot itself as a part of a method of the milking robot. It is particularly advantageous to store the milking data together with data which link the milking data to a certain teat of the dairy animal.

On the basis of the stored historical data associated with a dairy animal it is possible to calculate a last-teat period, so that the behaviour of a certain teat of the dairy animal in the past can be taken into account.

In a favourable embodiment of a method of milking a dairy animal, the historical milking data comprise the interval between the milking that is being carried out and the previous milking. In a stable phase of the lactation phase, a dairy animal is preferably milked three times daily. However, the dairy animal can already be allowed access to the milking robot six hours after the previous milking. If the interval between the milkings, designated hereinafter as milking interval, is short, the last-teat period is a short period. If the milking interval is longer, the last-teat period can be set at a higher value. As a result thereof, the milking will be ended less rapidly and the milking efficiency will be enhanced.

It will be obvious for a person skilled in the art that, according to the above-mentioned examples and other examples in this description, the last-teat period can be both a last-teat period which is equal to a period by which the last quarter continues to be milked after the milking of the third quarter has been ended, and a period which can be started after a deactivation threshold for the fourth quarter has reached a comparison value for that last teat that is still being milked.

In one embodiment, t4 is calculated or retrieved from a memory by control unit 13 and the milking of the last teat is ended a length of time t4 after the ending of the milking of the one-but-last teat on the basis of the comparison of the comparison value ĝ3 with threshold D3. For the last teat no calculation of the deactivation threshold is required. It is thus safeguarded that the milking of the last teat will continue for no more than a length of time t4 after the ending of the milking of the one-but-last teat.

It is not shown in FIG. 3b that, in one embodiment, the averaging period t1, over which an average of the value representative of the milk flow is taken, changes for the last teat that is being milked. In one embodiment, the more the time advances, the shorter the averaging time t1 that is taken. As a result thereof, the average value of the value representative of the milk flow will follow more and more accurately the instantaneous value, in which case a negative peak in the milk flow value has a considerable effect on that average value, so that the ending will be reached more rapidly.

The signals issued by the meters 11, 12 during the milking can be averaged over a certain period of time, for example over 24 hours, and/or over a number of milkings. As the cow will be milked several times daily, this average value can in each case be calculated as a progressive average. The conductivity meter 12 thus determines the current electric conductivity of the milk obtained and the computer 13 ensures the storage of the average, historical electric conductivity of the teat based on historical data.

This average, historical electric conductivity gives an indication about this parameter for that teat of that particular cow. When the comparator 19 of the computer 13 compares the current electric conductivity with the average, historical electric conductivity which is stored in the memory 17 of the computer 13, the difference between these values can be determined by the computer 13. It is obvious that it is possible to make use of an animal recognition system known per se which, for the sake of simplicity, will not be described here in further detail.

When the difference exceeds a certain, pre-settable value, the respective teat may be infected, and it is possible for the computer 13 to issue relevant signals for taking the necessary measures. In particular, it is of importance for the health of the cow in question that the teat is milked in another manner than would be the case when a normal conductivity value is detected. For this purpose, the means, in the present case the pulsation system 8, for deactivating the teat cup 2 are put into operation by the computer 13 at a point of time which depends on the measured average milk flow and the difference in electric conductivity. In particular, the computer 13 applies a mathematical function both to the value of the average milk flow and to the difference in electric conductivity for obtaining a so-called compensated deactivation threshold. The function should then preferably be such that at a raised conductivity the deactivation takes place at another point of time than usually, in other words at an increased conductivity the teat will be milked for a longer period of time.

Through long experience, it has appeared to be advantageous that, when the difference is greater than 10%, a function consisting in multiplying the average milk flow by 10 and in dividing it by the difference in electric conductivity ensures that the deactivation of the teat cup takes place at a point of time which is appropriate with respect to udder health.

It goes without saying that the average milk flow can also be used in combination with other milking parameters in order to put the means for deactivating the teat cup 2,31,32,33 into operation. When, for example, during the milking the temperature meter 11 issues a value which clearly differs from the relevant average value, i.e. is situated outside a certain tolerance range around the average value, this can be an indication of illness of the dairy animal. The computer 13 can then be programmed in such a manner that, in this case, it is immediately decided to deactivate the teat cup 2,31,32,33 and to disconnect the teat cup 2,31,32,33 from the teat. Moreover, it is possible for the computer 13 to give a warning signal to the farmer.

In the embodiment shown in FIG. 2, the device 1 comprises four teat cups 2,31,32,33. Each of the teat cups 2,31,32,33 can be connected to a teat of a cow. Of the milk from each of the teat cups 2,31,32,33 the milk flow is determined by the milk flow meter 11, the temperature by the temperature meter 11, and the electric conductivity by the conductivity meter 12. These data are used according to the embodiment described with reference to FIG. 1.

However, in the embodiment of FIG. 2, the computer 13 determines the teat from which at one point of time the milk has the lowest electric conductivity. For every other teat, the computer 13 determines the difference from the electric conductivity of the milk produced by that other teat relative to the lowest conductivity of the milk obtained from the teat producing the milk with the lowest conductivity. In a manner analogous to that of the above-described embodiment, the difference in the conductivity of the milk between the teats can be an indication of an infection in at least one of the teats. Like in the embodiment of FIG. 1, it is then advantageous that the means for deactivating the teat cup 2,31,32,33 are put into operation by the computer 13 at a point of time which depends on the average milk flow and the difference in electric conductivity. It has appeared that as a function, the same function, i.e. multiplying the average milk flow by 10 and dividing it by the difference in electric conductivity, can be used advantageously.

Additionally to the means for deactivating the teat cup 2,31,32,33, the device 1 can comprise a (non-shown) milking robot known per se, which milking robot comprises means for automatically connecting and disconnecting the teat cup(s). These means can be identical to or integrated with the means for deactivating the teat cups 2,31,32,33. However, the computer 13 is preferably suitable for determining a period of time from deactivation of the teat cup 2,31,32,33 and for putting the means for disconnecting the teat cup 2,31,32,33 into operation when the period of time has reached a certain time threshold value. The time threshold value is preferably settable, in which case a range between approximately 2 seconds and approximately 15 seconds has appeared to be advantageous.

It will be obvious that, in some cases, it is advantageous not immediately to deactivate the teat cup 2,31,32,33 when the current value of the milking parameter is equal to or lower than the threshold milking parameter value, but only when this situation occurs during a period of time which is settable for example between approximately 2 seconds and approximately 9 seconds. In particular, the period of time amounts to 3 seconds.

Likewise, average values can be determined from further signals which can be deduced from combinations of signals issued by a plurality of sensors. Likewise, in particular by the milk flow meter in combination with the quantity of milk collected per milking in the milk jar 3, signals can be deduced which are a measure for the milk velocity and/or the milk yield. The value of these signals, too, can be averaged. Said averaging processes are carried out in the computer 13 and will all relate to a certain animal or a certain group of animals and/or a certain period of time. The signals which are issued during the milking of separate animals by one or more sensors and which have a value different from this average value, can always be an indication that something is wrong with the health of the teats in question. Such an indication can be given by the computer 13 on an attention list, i.e. both be made visible on the display screen 14 of the computer 13 and be printed. In addition, it is possible to give an alarm, for example in the form of control lights to be disposed on the equipment, or via the mobile telephone of the farmer.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of milking a dairy animal, comprising:
connecting teat cups to teats of the dairy animal;
milking the teats of the dairy animal;
measuring, for each teat, a milking parameter representative of a milk flow from that teat;
assigning, during milking, a first group of teats and a second group of teats, wherein the second group includes at least a last teat being milked;
calculating a set of first comparison values associated with the first group of teats, each of the first comparison values being associated with a respective teat from the first group, each first comparison value being calculated in a first manner of calculation, the first manner of calculation depending on the milking parameter of each respective teat from the first group, and
calculating a set of second comparison values associated with the second group of teats, each of the second comparison values being associated with a respective teat from the second group, each second comparison value being calculated in a second manner of calculation, the second manner of calculation depending on the milking parameter of each respective teat from the second group, and the second manner of calculation being different from the first manner of calculation; and
ending the milking of each teat once the respective first or second comparison value reaches a deactivation threshold associated with that teat.

2. The method according to claim 1, wherein the second group of teats further comprises a second to last teat being milked.

3. The method according to claim 1, wherein the first manner of calculation comprises taking an average of the respective milking parameter over a first averaging period, or taking an average of a derived parameter which has been derived from the respective milking parameter over a first averaging period.

4. The method according to claim 3, wherein the second manner of calculation comprises taking an average of the respective milking parameter over a second averaging period, or taking an average of a derived parameter which has been derived from the respective milking parameter over a second averaging period, the second averaging period being shorter than the first averaging period.

5. The method according to claim 1, wherein the first manner of calculation comprises using a first filter and wherein the second manner of calculation comprises using a second filter different from the first filter.

6. The method according to claim 5, comprising selecting milking parameters for the first filter and the second filter, wherein the milking parameters are within a specific range of values, and wherein the range for the second manner of calculation differs from the range for the first manner of calculation.

7. The method according to claim 1, wherein milking the teats comprises calculating at least one of the first and second comparison values in dependence on the length of time of the milking, or wherein a comparison value is calculated in dependence on a time interval between the starting of the milking of respective teats.

8. The method according to claim 1, wherein the method further comprises calculating each deactivation threshold during the milking and depending on the respective milking parameter and the calculated deactivation threshold associated with the last teat has a raised value.

9. The method according to claim 8, comprising one or more of:
wherein, for each teat, the deactivation threshold associated with that teat is calculated; and
wherein raising the deactivation threshold for ending the milking of the last teat is time-dependent;
wherein calculating the deactivation threshold comprises averaging the milking parameter representative of the milk flow over an averaging period or averaging a derived parameter which has been derived from the milking parameter representative of the milk flow; and
wherein the deactivation threshold is calculated in dependence on a time interval between the starting of the milking of the respective teats of the first group; and
wherein the deactivation threshold of the last teat is adjusted, in such a manner that the ending of the milking of the last teat will be reached more rapidly.

10. The method according to claim 9, wherein the deactivation threshold for ending the milking of the last teat is time-dependent, and further at least one of: wherein the deactivation threshold calculated for the last teat depends on a length of time from the ending of the milking of a second-to-last teat being milked; wherein the deactivation threshold is raised over time; and wherein the raising of the deactivation threshold is time-dependent of the moment of starting the milking of the last teat.

11. The method according to claim 9, wherein the averaging period has a predetermined duration.

12. The method according to claim 9, wherein calculating the deactivation threshold comprises averaging the milking parameter representative of the milk flow over the averaging period for the deactivation threshold is a pre-determined averaging period surrounding a maximum of a milking parameter.

13. The method according to claim 1, wherein the ending of the milking of the last teat takes place after a last-teat period has elapsed, which last-teat period is predetermined or depends on the duration of the milking of that teat.

14. The method according to claim 1, wherein the method further comprises providing historical milking data regarding the dairy animal, and calculating a last-teat period on the basis of the historical data, wherein the ending of the milking of the last teat depends on a course of a last-teat period.

15. The method according to claim 14, wherein the method further comprises calculating the first or second comparison value on the basis of the respective milking parameter, and wherein deactivating the milking for each teat further depends on reaching the deactivation threshold associated with that teat using the first or second comparison value.

16. The method according to claim 14, wherein the last-teat period is a period after a second-to-last teat being milked.

17. The method according to claim 14, wherein the last-teat period is calculated during the milking based on the historical milking data as generated during the milking.

18. The method according to claim 17, wherein, the last-teat period depends on the duration of the milking of a second-to-last teat being milked.

19. The method according to claim 18, wherein the last-teat period depends on the measured milking parameters.

20. The method according to claim 14, wherein the method comprises identifying the dairy animal and retrieving historical milking data from a memory based on milking parameters of an earlier milking of the identified dairy animal.

21. The method according to claim 1, wherein the second comparison value corresponds to a greater extent to an instantaneous value of the milk flow, in comparison to the first comparison value.

22. A device for automatically or semi-automatically milking a dairy animal, wherein the device comprises teat cups and a robot arm configured to connect the teat cups to teats of the dairy animal for milking the dairy animal, wherein the device further comprises a measuring unit for measuring a respective milking parameter representative of a milk flow in each teat cup, the measuring unit being connected to and is configured to send the respective milking parameter to a control unit, wherein the control unit is configured to:

assign, during milking, a first group of teat cups and a second group of teat cups, wherein the second group includes at least a last teat cup used in milking;

calculate a set of first comparison values associated with the first group of teat cups, each of the first comparison values being associated with a respective teat cup from the first group, each first comparison value being calculated in a first manner of calculation, the first manner of calculation depending on the respective milking parameter of each teat cup from the first group;

calculate a set of second comparison values associated with the second group of teat cups, each of the second comparison values being associated with a respective teat cup from the second group, each second comparison value being calculated in a second manner of calculation, the second manner of calculation depending on the respective milking parameter of each respective teat cup from the second group, the second manner of calculation being different from the first manner of calculation; and end the milking of each teat cup once the respective first or second comparison value reaches a deactivation threshold associated with that teat cup.

23. The device according to claim 22, wherein the control unit is further configured to calculate each first comparison value in dependence on an average of each respective milking parameter over a first averaging period.

24. The device according to claim 23, wherein the control unit has a memory, and wherein the averaging period is stored in said memory.

25. The device according to claim 24 wherein the control unit is configured to calculate each second comparison value in dependence on an average of each respective milking parameter over a second averaging period, the second averaging period being different from the first averaging period.

26. The device according to claim 25, wherein the second averaging period is shorter than the first averaging period.

27. The device according to claim 22, wherein the control unit is configured to calculate the first or second comparison value in dependence on the duration of the milking with the respective teat cup.

* * * * *